United States Patent Office 2,999,086
Patented Sept. 5, 1961

2,999,086
METHOD FOR PREPARING HIGHLY CRYSTALLINE POLYPROPYLENE
Egi Victor Fasce, Baton Rouge, Neville Leverne Cull, Baker, and Robert Joseph Fritz, Baton Rouge, La., assignors to Esso Research and Engineering Company, a corporation of Delaware
No Drawing. Filed May 22, 1957, Ser. No. 660,746
2 Claims. (Cl. 260—93.7)

The present invention concerns novel polymers, their preparation and the catalysts used to prepare them. Specifically, it concerns the treatment of a catalyst and the polymerization of alpha olefins in the presence of a high viscosity diluent.

It is known that olefins, such as ethylene, propylene, etc. can be polymerized at relatively low pressures by using various combinations of aluminum compounds and reducible heavy metal compounds, e.g., titanium zirconium and iron. Among the most active types of catalyst for this reaction are combinations of trialkyl aluminum or dialkyl aluminum halide with a titanium tetrahalide. For instance, excellent results are obtained by using combinations of triethyl aluminum or diethyl aluminum chloride with titanium tetrachloride, made by simply mixing the catalyst components at atmospheric temperature in suitable solvents. These catalysts have been found to afford high yields of high molecular weight, solid polymers, especially with monomers, such as ethylene and propylene, as well as other olefins even at pressures as low as atmospheric.

These catalysts may be prepared by reacting an aluminum compound with a heavy metal compound at a temperature between about 20 and 90° C. Generally the product is a brown, amorphous catalyst which is unstable and tends to make a less crystalline polymer when activated with additional aluminum compound. If it is desired to make a highly crystalline polymer, for instance an isotactic polypropylene, the catalyst should have a crystalline structure. In the case of titanium, the crystalline titanium trichloride is identified by its purple or violet color and its characteristic X-ray diffraction pattern. While it is known in the art that purple crystalline titanium trichloride may be prepared by reacting titanium tetrachloride with titanium at a temperature between about 400 and 500° C. under a pressure of about 10 to 50 atmospheres, or by reacting the tetrachloride with hydrogen in the presence of a glowing tungsten filament, there is no known method for preparing the crystalline form using organo-metallic compounds, e.g. aluminum triethyl, as the reducing agent.

It has now been discovered that highly crystalline polymerization catalysts may be prepared at relatively low temperatures by reacting a metallic reducing compound with a reducible heavy metal compound in the presence of a high viscosity diluent and that a finely divided crystalline polymer is formed if alpha olefins are polymerized in the presence of the same diluent.

According to one embodiment of the present invention the theoretical amount of a reducing compound, such as aluminum trialkyl, is reacted with a reducible heavy metal compound, such as compounds of those metals found in groups IV to VI and VIII of the periodic system, at a temperature between about 100 and 300° C. in the presence of a naphthenic or naphthenic-paraffinic hydrocarbon diluent having a Saybolt viscosity between 90 and 400 seconds at 37.5° C. The reaction product or catalyst intermediate, may then be activated with an additional metallic compound, especially an organo-metallic compound such as aluminum trialkyl. The catalyst, which is at least partially crystalline, forms a highly crystalline polymer with alpha olefins, such as propylene.

The reaction conditions should be chosen so that a catalyst of the desired degree of crystallinity is obtained. This is preferably achieved by pretreating the reducible component with a reducing agent at a temperature between about 120 and 200° C. and, in the case of titanium halides and aluminum alkyls, the best results are obtained at temperatures between about 135 and 175° C., the optimum temperature being dependent of reaction time, concentration of reactants and type of solvent employed. The time required for the reaction is preferably between about 20 minutes and 2 hours.

The pretreatment reaction is carried out in the presence of naphthenic or naphthenic-paraffinic hydrocarbon diluent having a sufficiently high viscosity to permit the reaction product to form finely divided well oriented crystals. The viscosity of the diluent is an important feature of this invention because it affects the crystallinity and activity of the catalyst. Highly active catalysts and crystalline polymers are obtained with isoparaffinic-cycloparaffinic diluents having viscosities between 90 and 400 seconds at 37.5° C. in the Saybolt Universal Viscometer. The preferred diluents have SSU viscosities of 100 to 350 seconds at 37.5° C. and 35 to 55 seconds at 99° C. An especially desirable diluent is one having a SSU viscosity of 250–350 seconds at 37.5° C. and a viscosity index of 75 to 95. Furthermore, the diluent should be free of n-paraffins, olefins and aromatics, and contain no more than a minor proportion of iso-paraffins, preferably less than about 20 wt. percent, e.g., 1 to 15 wt. percent. It should have a boiling range between about 250 and 500° C., and an API gravity between about 28 and 32. If the pretreatment temperature exceeds the initial boiling point of the diluent, pressure sufficient to maintain a liquid phase throughout the reaction may be applied. The concentration of the reactants during the pretreatment stage should be between about 5 and 100 grams/liter of diluent, preferably between about 10 and 50 grams/liter.

Because these catalysts are easily poisoned, the crystalline catalyst should be prepared under an inert atmosphere, such as dry nitrogen. Other suitable inert materials include helium, argon, hydrogen and hydrocarbons such as methane and ethane.

The mol ratio of reactants in the pretreatment stage should be such that the reducible compound is reduced to the next lower level, e.g. $TiCl_4$ to $TiCl_3$, with preferably the stoichiometric amount of reducing agent based on the maximum theoretical reducing capacity of the latter. If an excess of reducing agent is used, the product will be over-reduced and result in an unstable amorphous form which has a low activity and yields a less crystalline polymer. On the other hand, if too small an amount of reducing agent is employed, only a portion of the reducible substance will be in the desired stable form and the unreduced material will be susceptible to over-reduction during the polymerization. Thus, the mol ratio of reducing agent/reducible compound must be very carefully controlled to meet these specific requirements. For example, conventional catalyst preparations employ ratios of 0.5/1 or higher of aluminum triethyl to titanium tetrachloride, whereas it has now been found that by using ratios of about 0.30 to 0.36/1, and preferably 0.33/1, overreduction is avoided when pretreatment temperatures above about 100° C. are employed. Similarly when other metal alkyl compounds are used, such as aluminum ethyl dichloride and aluminum diethyl chloride, the stoichiometrical ratio of alkyl metal compound to $TiCl_4$, based on the maximum theoretical reducing capacity of the former compounds, should be employed. Previously, very weak reducing agents, such as aluminum ethyl dichloride were thought to be incapable of reducing $TiCl_4$ to produce an active catalyst. However, at temperatures above about 100° C. aluminum ethyl dichloride is capable of reducing $TiCl_4$ to $TiCl_3$ which can be used for the polymerization of alpha olefins such as propylene, when activated with aluminum triethyl or aluminum diethyl chloride.

Whereas the minimum ratio of alkyl metal compound to $TiCl_4$ that can be advantageously used for the catalyst preparation is determined by the maximum reducing capacity of the alkyl metal with respect to the formation of $TiCl_3$, the corresponding maximum ratio is determined by the ability of the alkyl metal to further reduce $TiCl_3$ to $TiCl_2$. Thus the ratio of alkyl metal compound to reducible compound must be carefully adjusted so that after the desired reduction has taken place no alkyl metal compound is present which is capable of causing further reduction. For instance, aluminum diethyl chloride and aluminum ethyl dichloride will not reduce titanium trichloride at temperatures of below about 70 and 100° C., respectively. Their ability to accomplish this reduction increases, however, with increasing temperature. This means that at temperatures above 100° C. in the aluminum triethyl/titanium tetrachloride system, all the alkyl groups will be used in the first reduction step. Thus in this system it is critical to use a molar ratio of about 0.30/1 to 0.36/1. Obviously the optimum ratio is dependent upon the number of active alkyl groups and will vary with the number of such groups in the compounds used. For instance, in the case of an aluminum diethyl chloride/titanium tetrachloride system, or a zinc diethyl/titanium tetrachloride system, the mol ratio should be about 0.5. Similarly, the type of transition metal compound to be reduced may have an influence on the optimum ratio.

A large number of reducing compounds can be used to pretreat and activate the heavy metal compound. Among the most valuable are alkyl or aryl aluminum compounds, especially trialkyl aluminum compounds, such as triethyl aluminum, tripropyl aluminum, triisobutyl aluminum, etc. and dialkyl aluminum compounds such as diethyl aluminum halides, diethyl aluminum chloride in particular, dipropylhalides, diisobutylhalides, etc. However, as previously mentioned, monoalkyl aluminum compounds can also be used. Generally, in addition to trialkyl or aryl aluminum, organo aluminum compounds carrying two or at least one hydrocarbon radical, as well as one or two electron attracting groups, such as halogen, alkoxy, organic nitrogen or sulfur groups, etc. may be used. Instead of the alkyl or aryl aluminum compounds, the corresponding hydrides or mixed hydrides of aluminum may be used.

Other suitable reducing materials include organo-metallic compounds of elements in the I, II and III groups of the periodic system as well as hydrides or mixtures of alkyl or aryl compounds and hydrides of these elements. In addition to this, alkali and alkaline earth metals as well as certain other metals such as aluminum which have sufficient reactivity at the temperatures employed, may be used in the reduction. Whatever material is used for the reduction, it is important that the ratio between reducing agent and transition metal compound be adjusted so that over-reduction or under-reduction will be prevented.

Heavy metal compounds suitable for the purposes of the invention include such inorganic compounds as the halides, oxy-halides, complex halides, oxides, hydroxides, and organic compounds such as alcoholates, acetates, benzoates, and acetyl acetonates of the transition metals of the IV, V, VI and VIII groups of the periodic system, e.g., titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds are readily reducible requiring only low activation temperatures: titanium tetrachloride, titanium tetrabromide, zirconium tetrachloride, zirconium tetrabromide and zirconium acetylacetonate.

In one embodiment of this invention the reactants are mixed at a low temperature, say 60 to 80° C., and then heated slowly in the presence of a naphthenic diluent having an SSU viscosity between 90 and 400 seconds at 37.5° C. to a temperature of about 100 to 300° C., preferably about 135 and 175° C., over a period of time of from about 5 minutes to 5 hours. Generally the reaction is complete and a crystalline product obtained after about 20 minutes to 2 hours.

The composition of the catalyst intermediate may vary according to the reactants and the reaction conditions. For instance, where the heavy metal compound is a titanium halide and the reducing compound is an aluminum alkyl, there may be between about 0.3 to 1 atom of aluminum per atom of titanium depending on the number of alkyls in the aluminum compound. To illustrate this, where an aluminum alkyl dichloride is used the atomic ratio of Al/Ti in the intermediate should be 1 to 1, where an aluminum dialkyl chloride is used it should be 0.5 to 1 and where an aluminum trialkyl is used it should be 0.33 to 1.

The catalysts so pretreated are activated, in the presence or absence of the alpha-olefin to be polymerized, by the addition of further amounts of alkyl metal compounds, trialkyl aluminum compounds in particular. The amount of alkyl metal needed for activation will depend upon the particular pretreated catalyst intermediate and the pressure used during the polymerization. If the polymerization pressure is approximately atmospheric, the greatest activation is obtained with trialkyl aluminum compounds, e.g., triethyl aluminum and tripropyl aluminum. The amount of trialkyl metal compound added should be such that, after it has reacted with compounds such as $AlCl_3$ to form the corresponding dialkyl-halide, about one mol of unreacted trialkyl aluminum remains in the system for each mol of $TiCl_3$ in the pretreated catalyst. For instance, if a trialkyl aluminum is employed, both to reduce $TiCl_4$ and activate the catalyst intermediate, a total Al/Ti molar ratio of about 1.5 to 3.0, and preferably about 2.0 should be used.

The total molar ratio, including any aluminum compound used in the pretreatment step, of the aluminum alkyl compound to titanium halide in the catalyst has an influence on the molecular weight of the polymer obtained. In general, the total Al/Ti ratio should be between about 1 and 12. The higher this ratio is, the higher will be the moleculer weight of the polymer. In some instances it may be desirable to activate the catalyst with a different metal alkyl compound than was used to reduce the heavy metal compound.

The polymerization process may be carried out under conventional conditions used in the low pressure polymerization of olefins. These conditions depend somewhat on the specific olefin involved and on the type of polymer desired. Propylene is the preferred olefin although any $C_2$ to $C_5$ alpha olefin, such as ethylene, butene-1 or pentene-1, may be used alone or in combination. In the case of propylene, the polymerization may be carried out by intimately contacting gaseous propylene with the catalyst, for example, by bubbling the propylene into a suspension of the catalyst in an inert solvent or diluent. Neither the polymerization temperature nor the polymerization pressure is particularly critical, but it is preferred to operate at temperatures of about 0 to 110° C. and especially between about 40 to 90° C.

Pressures ranging anywhere from subatmospheric to 250 atmospheres have been used heretofore. While this full pressure range may be employed with the catalysts of the present invention, pressures substantially above atmospheric, e.g., 10 to 100 atmospheres, have been considered necessary for good catalyst activity, especially when aliphatic diluents are used. An advantage of this invention is that generally the polymerization can be carried out at substantially lower pressures than are required to accomplish similar results with conventionally prepared catalysts. This is attributable to the high reactivity and other unique properties of these new catalysts.

The polymerization reaction is preferably carried out, while stirring in a batch or continuous operation, in the presence of the same type of diluent used in the pretreatment stage although lighter diluents may be used, if desired. If the high viscosity diluent is employed, a diluent of a lower viscosity and/or lower boiling range may be used to facilitate its separation from the polymer. When operating batchwise, olefin introduction is continued until the catalyst is wholly or partially exhausted and the reaction starts to cease. Sufficient pressure may be applied during the reaction to maintain the lower boiling diluents in a liquid state. The polymer concentration in the reaction mixture may be about 10 to 40 wt. percent.

The amount of catalyst employed may vary within wide limits depending somewhat on the purity of the olefin feed. Proportions as small of 0.1 part by weight of catalyst per 1,000 parts by weight of olefin are sufficient if the feed is pure. With olefin feed streams containing up to about 0.01% of water, carbon dioxide or certain other oxygenated compounds, catalyst proportions of about 0.5 to 5 wt. percent are usually adequate.

Upn completion of the polymerization reaction, the catalyst may be completely deactivated, e.g., by the addition of an alcohol, such as isopropyl alcohol or n-butyl alcohol, in amounts of about 10 to 100 times the amount of catalyst used. The reaction slurry may then be filtered, the filter cake reslurried in a catalyst solvent, such as dry, concentrated alcohol at about 50 to 100° C. for 15 to 60 minutes, filtered again and the filter cake dried, preferably under reduced pressure. Ash residues in the polymer are reduced below about 0.05% by this procedure. If necessary, the ash content may be further reduced by aqueous acid treatment, etc. according to methods well known in the art, or by using chelating agents, such as acetylacetone.

The polymers produced according to the present invention have molecular weights in the range of about 100,000 to 300,000 or even as high as 3,000,000 as determined by the intrinsic viscosity method using the I. Harris Correlation (J. Polymer Science 8 361, 1952). They have a high degree of crystallinity and a low solubility in n-heptane, generally at least 80 weight percent insoluble in heptane. In some instances the n-heptane insoluble portion is as much as 90 to 95 weight percent.

The invention will be best understood by referring to the following experimental data and specific examples.

EXAMPLE 1

The following experiments demonstrate the effect of various diluents on the formation of crystalline catalyst. In each run 1.08 grams of aluminum triethyl and titanium tetrachloride were reacted in an Al/Ti ratio of 0.33 for one hour at 140° C. in 100 cc. of diluent. The results are set forth in Table I.

*Table I*

| Run | #1 | #2 | #3 |
|---|---|---|---|
| Diluent | Tervan Wax (M.P. 53° C.) | Octadecane | Naphthenic-isoparaffinic hydrocarbon.[1] |
| Catalyst | Brown | Brown | Violet |
| Gas Evolved | Considerable Gas | | 0.09 |

[1] The diluent (Nujol) used in run #3 was free of aromatic and n-paraffinic hydrocarbons and had the following properties:

| | |
|---|---|
| Viscosity at 37.5° C., SSU | 349.5 |
| Viscosity at 99° C., SSU | 53.28 |
| API gravity | 28.6 |
| Boiling range | 350–425° C. |
| Viscosity index | 83 |

The wax and octadecane diluents apparently decomposed during the pretreatment reaction as evidenced by the non-condensable gas formed. The decomposition had a deleterious effect on the recation product since, in each instance where it occured, the product had a brown color which is indicative of an amorphous structure.

EXAMPLE 2

Another series of experiments was undertaken to illustrate the advantage of using a high viscosity naphthenic diluent in both the pretreatment and polymerization stage. In each case 0.18 gram of aluminum triethyl was reacted with 0.90 gram of titanium tetrachloride (catalyst concentration was 10.8 grams/liter), which corresponds to an Al/Ti ratio of 0.33, for 1 hour at 140° C. The reaction product was combined with additional aluminum triethyl in another or the same diluent, to bring the Al/Ti ratio to 2 and the catalyst concentration to 1.8 grams/liter of diluent. The propylene was fed into the reactor at a rate of 100 liters/hour. The results are set forth in Table II.

*Table II*

| | #4 | #5 | #6 |
|---|---|---|---|
| Pretreatment: | | | |
| Diluent | Alkylate Bottoms | Alkylate Bottoms | Naphthenic-isoparaffinic hydrocarbon.[1] |
| Catalyst, color | Violet | Violet | Violet |
| Polymerization: | | | |
| Temperature, °C | 84.5 | 82 | 82 |
| Diluent | n-heptane | Alkylate Bottoms[2] | Naphthenic-isoparaffinic hydrocarbons.[1] |
| Time | 1 hour | 1 hour | 1 hour |
| Reaction Rate, grams/hr./gram | 25 | 57 | 31.5 |
| Polymer Properties: | | | |
| Intrinsic Viscosity, dl./g | 1.92 | 1.89 | 2.22 |
| Heptane Insoluble, wt. Percent | 69 | 65 | 93 |
| Form | Bulky | Bulky | Fine |

[1] Same diluent used in Example 1.
[2] Boiling range of alkylate bottoms was 320 to 414° F.

These data show the benefits derived from employing a high viscosity naphthene-paraffinic diluent in both the pretreatment and polymerization reactions. The polymer obtained in run #6 had a high crystallinity, as shown by its n-heptane insoluble value, and a finely divided form. The solubility in heptane was measured by extracting the polymer in a Soxhlet apparatus for 12 hours.

EXAMPLE 3

In another experiment the catalyst intermediate was pretreated in the same diluent used in run #3 in Example 1 but the polymerization was carried out in the presence of n-heptane.

*Table III*

| Pretreatment conditions: | Run # 7 |
|---|---|
| Al/Ti ratio | 0.33 |
| Catalyst concentration, grams/liter | 10.8 |
| Temperature, ° C | 140 |
| Time, hours | 1 |
| Diluent | Naphthenic-isoparaffinic hydrocarbon |
| Catalyst color | Violet |
| Polymerization conditions: | |
| Al/Ti ratio | 2 |
| Catalyst concentration, grams/liter | 1.8 |
| Temperature, ° C | 67 |
| Time, hours | 5 |
| Reaction rate, grams/hr./gram | 31.5 |
| Polymer properties: | |
| Heptane insoluble, wt. percent | 79 |
| Instrinsic viscosity, dl./gram | 2.58 |
| Form | Bulky |

These data show that, while pretreating with a high viscosity diluent produces an isotactic polymer, it does not have the finely divided form obtained when the same diluent is used in the polymerization. It is therefore preferred to both pretreat and polymerize in the presence of a high viscosity naphthenic-isoparafinic diluent.

EXAMPLE 4

A series of experiments was carried out with a lower viscosity naphthenic hydrocarbon liquid diluent which was free of aromatics and n-paraffins. The diluent had the following properties:

| | |
|---|---|
| Boiling range | 290–400° C. |
| Specific gravity | 0.865–0.875 |
| SSU viscosity @ 37.5° C | 95–105 |

10 cc. of heptane containing 0.9 gram of $TiCl_4$ was mixed with 50 cc. of the above diluent and pretreated with a mixture of 3.2 cc. of heptane containing 0.18 gram of triethyl aluminum and 50 cc. of the naphthenic diluent (Al/Ti ratio=0.33/1) by heating the combination to 140° C. over a period of 17 minutes and held there for 1 hour. A violet color appeared indicating the presence of $TiCl_3$.

To the pretreated catalyst 900 cc. of the naphthenic diluent containing 16.0 cc. of 0.5 M $Al(C_2H_5)_3$ (0.91 gms.) were added. The resulting Al/Ti ratio was increased to 2/1 and the catalyst concentration decreased to 1.98 gm./liter. The temperature after addition decreased to 60° C. when propylene was introduced at rate of 100 L/hr. The polymerization temperature was increased to 82° C. over period of 5 minutes and continued at this temperature for one hour. At the conclusion of the run, 1000 cc. of butanol were added and the mixture agitated for half an hour at 65° C. The separated polymer was a fine grained suspension.

The polymer mixture was filtered, washed with addition butanol and air dried.

Table IV

| | |
|---|---|
| Gms. polymer grams | 68 |
| W/hr./W | 34 |
| Intrinsic viscosity | 2.2191 |
| Harris mol. wt | 128,723 |
| Heptane insoluble, wt. percent | 82.2 |
| Oxide ash, wt. percent | 0.034 |

The data show that a highly crystalline polypropylene was prepared with the lower viscosity naphthenic diluent. However, since the crystallinity was below that obtained with the higher viscosity diluent, the latter diluent is preferred.

EXAMPLE 5

Example 4 was repeated except the catalyst concentration was 1.0 gram instead of 1.98 grams/liter.

The recovered polymer represented a yield of 41 gm./hr./gm. total catalyst and possessed the fololwing properties:

Table V

| | |
|---|---|
| Intrinsic viscosity | 2.21 |
| Harris mol. wt | 128,096 |
| Heptane insoluble, wt. percent | 80.5 |
| Oxide ash, wt. percent | 0.071 |

The close agreement in the properties of the polymer from both runs is to be noted.

Although the catalyst preparations in the examples were done batchwise and were used in batch runs, it is obviously within the scope of this invention to utilize batch preparations in continuous polymerizations or to accomplish the batch type preparation by pretreating in two stage or in pipe flow to obtain the effect of batch pretreatment. The invention is not to be limited to the specific examples given. The relative proportions of the materials used and the reaction conditions may be varied within the limits indicated in the specification to obtain products of varying characteristics.

What is claimed is:

1. A method of preparing a polypropylene polymer which comprises reacting a titanium tetrahalide with the theoretical amount of an aluminum trialkyl in the presence of a hydrocarbon diluent selected from the class consisting of naphthenic hydrocarbons and mixtures thereof with no more than 20 weight percent of isoparaffinic hydrocarbons, said diluent being substantially free of n-paraffins and aromatics and having a viscosity between 90 and 400 seconds at 37.5° C., a boiling point in the range of 250° to 500° C. and an API gravity of 28 to 32 to reduce the valence of said halide to the next lower level, slowly heating the reaction product to a temperature between 100 and 300° C. until it becomes crystalline, combining the reaction product with an aluminum alkyl activator and polymerizing the olefin with said activated reaction product under a low pressure in the presence of a hydrocarbon diluent as previously described.

2. The method of claim 1 in which the aluminum trialkyl is aluminum triethyl.

References Cited in the file of this patent

UNITED STATES PATENTS

| | | |
|---|---|---|
| 1,914,557 | Craver | June 20, 1933 |
| 2,388,178 | Peterson | Oct. 30, 1945 |
| 2,396,920 | Larson | Mar. 19, 1946 |
| 2,439,765 | Walker | Apr. 13, 1948 |
| 2,824,089 | Peters et al. | Feb. 18, 1958 |
| 2,824,145 | McCall et al. | Feb. 18, 1958 |
| 2,827,446 | Breslow | Mar. 18, 1958 |
| 2,843,577 | Friedlander et al. | July 15, 1958 |
| 2,845,414 | Schutze | July 29, 1958 |

FOREIGN PATENTS

| | | |
|---|---|---|
| 526,101 | Italy | May 14, 1955 |
| 533,362 | Belgium | May 16, 1955 |
| 546,846 | Belgium | Apr. 7, 1956 |